(12) United States Patent
Takeda et al.

(10) Patent No.: US 8,083,847 B2
(45) Date of Patent: *Dec. 27, 2011

(54) FINE PARTICLE DISPERSION OF INFRARED-SHIELDING MATERIAL, INFRARED-SHIELDING BODY, AND PRODUCTION METHOD OF FINE PARTICLES OF INFRARED-SHIELDING MATERIAL AND FINE PARTICLES OF INFRARED-SHIELDING MATERIAL

(75) Inventors: Hiromitsu Takeda, Ichikawa (JP); Kenji Adachi, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/544,373

(22) PCT Filed: Oct. 15, 2004

(86) PCT No.: PCT/JP2004/015249
§ 371 (c)(1),
(2), (4) Date: Aug. 31, 2005

(87) PCT Pub. No.: WO2005/037932
PCT Pub. Date: Apr. 28, 2005

(65) Prior Publication Data
US 2006/0178254 A1    Aug. 10, 2006

(30) Foreign Application Priority Data

Oct. 20, 2003 (JP) ................................. 2003-359838
Feb. 3, 2004 (JP) ................................. 2004-026901

(51) Int. Cl.
*C04B 14/00* (2006.01)
(52) U.S. Cl. ........................................ 106/479; 428/328
(58) Field of Classification Search .................. 106/479
See application file for complete search history.

(56) References Cited

U.S. PATENT DOCUMENTS 3,619,219 A * 11/1971 Bromer et al. .................. 501/50
(Continued)

FOREIGN PATENT DOCUMENTS

JP         A 8-12378          1/1996
(Continued)

OTHER PUBLICATIONS

Fan, R. et al., "Chemical synthesis and electronic conduction properties of sodium and potassium tungsten bronzes," Journal of Physics and Chemistry of Solids, vol. 61, No. 12, pp. 2029-2033, Dec. 2000.
(Continued)

*Primary Examiner* — Jessica L Ward
*Assistant Examiner* — Nicholas D'Aniello
(74) *Attorney, Agent, or Firm* — Oliff & Berridge, PLC

(57) ABSTRACT

To provide an infrared-shielding body sufficiently transmitting visible rays, having no half-mirror shaped appearance, requiring no large-scale apparatus when forming a film on a substrate, efficiently shutting invisible near-infrared rays with wavelength range of 780 nm or more, while eliminating a heat treatment at high temperature after film formation, and having a spectral characteristic such as transparency with no change of color tone. The starting material, which is a mixture containing a predetermined amount of a tungsten compound, is heated at 550° C. in a reductive atmosphere for 1 hour, then cooled to room temperature once in an argon atmosphere, thus producing powder of $W_{18}O_{49}$. Then, the powder, the solvent, and the dispersant are mixed, then subjected to dispersion treatment to obtain a dispersion solution. The dispersion solution and a UV-curable hardcoat resin are mixed to obtain a solution of fine particle dispersion of infrared-shielding material. The solution of the fine particle dispersion of infrared-shielding material is applied on a PET resin film to form a film, which is then cured, and an infrared-shielding film having a transmission profile shown in the figure is thereby obtained.

12 Claims, 3 Drawing Sheets

U.S. PATENT DOCUMENTS

| | | | |
|---|---|---|---|
| 5,855,849 A * | 1/1999 | Li et al. | 422/88 |
| 7,655,301 B2 * | 2/2010 | Chonan et al. | 428/328 |
| 2002/0037071 A1 * | 3/2002 | Kohda | 378/154 |
| 2003/0122114 A1 | 7/2003 | Dobler et al. | |
| 2003/0211238 A1 * | 11/2003 | Lee et al. | 427/180 |
| 2004/0029998 A1 * | 2/2004 | Tomita et al. | 523/136 |

FOREIGN PATENT DOCUMENTS

| | | | |
|---|---|---|---|
| JP | A 8-59300 | | 3/1996 |
| JP | A-08-073223 | | 3/1996 |
| JP | A 8-73223 | | 3/1996 |
| JP | A 8-283044 | | 10/1996 |
| JP | A 9-107815 | | 4/1997 |
| JP | A 9-127559 | | 5/1997 |
| JP | 09249542 | * | 9/1997 |
| JP | A 2000-119045 | | 4/2000 |
| JP | A 2000-233929 | | 8/2000 |
| JP | A 2002-6102 | | 1/2002 |
| JP | A 2003-29314 | | 1/2003 |
| JP | A 2003-121884 | | 4/2003 |
| JP | A-2003-225573 | | 8/2003 |
| SU | 1558998 A1 | | 4/1990 |
| SU | 1713982 A1 | | 2/1992 |

OTHER PUBLICATIONS

Viswanathan, K. et al., "Crystal Structure and Change Carrier Concentration of $W_{18}O_{49}$," Journal of Solid State Chemistry, vol. 36, No. 1, pp. 46-48, Jan. 1981.

Nikalasson, G. et al., "Polaron absorption in tungsten oxide nanoparticle aggregates," Electrochimica Acta, vol. 46, No. 13-14, pp. 1967-1969, Apr. 2001.

Wang, Zhi Yuan et al., "Near-infrared absorbing organic materials," Pure & Applied Chemistry, vol. 76, No. 7-8, pp. 1435-1443, Jan. 2003.

May 7, 2010 Search Report in European Application No. 04792466.7.

* cited by examiner

[FIG.1]
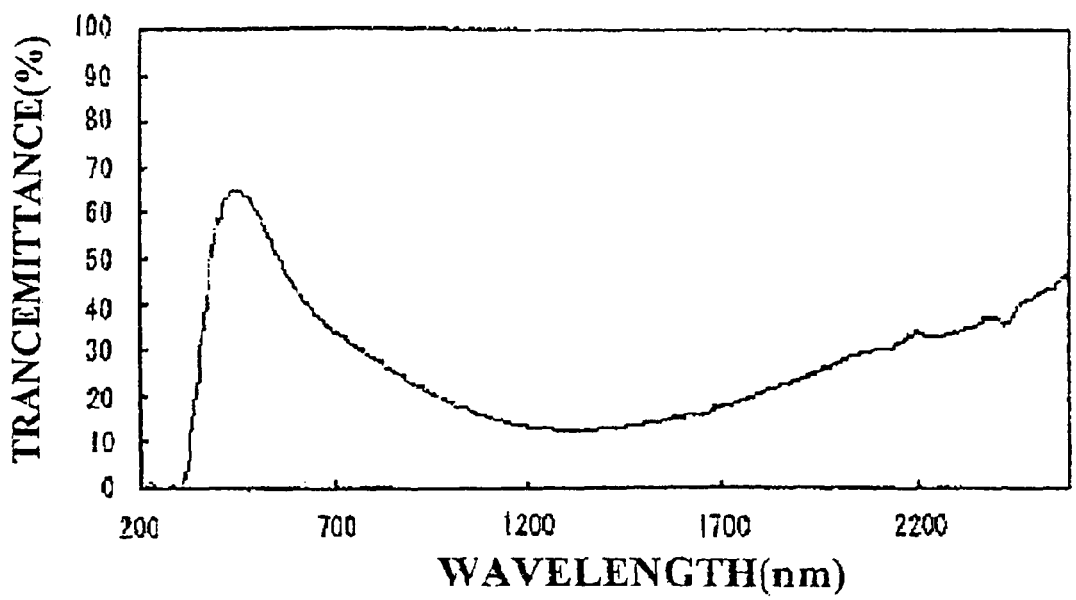
[FIG.2]
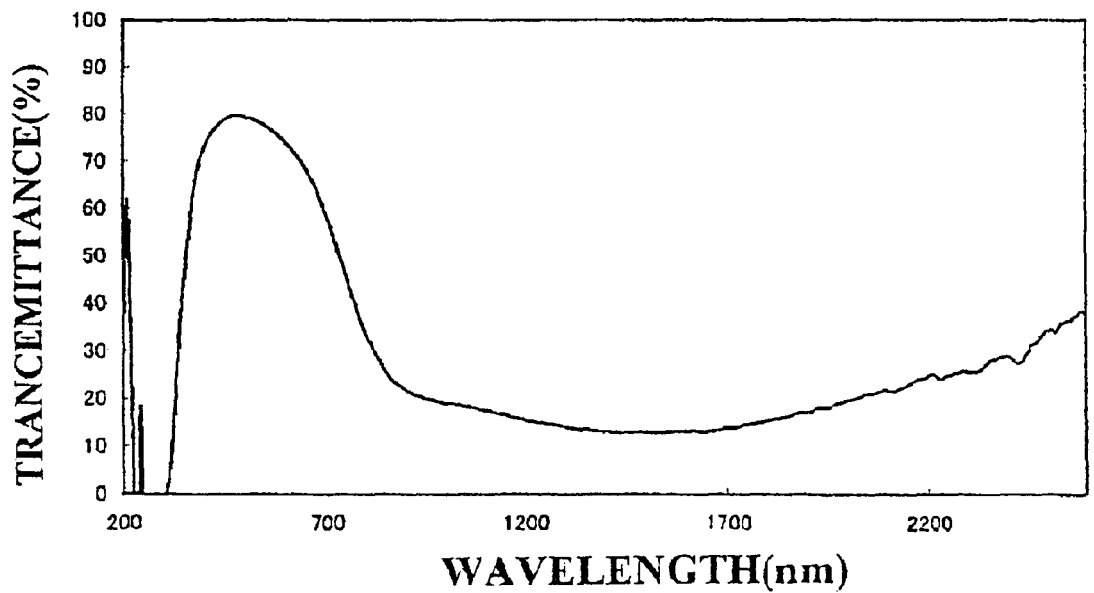

[FIG.3]
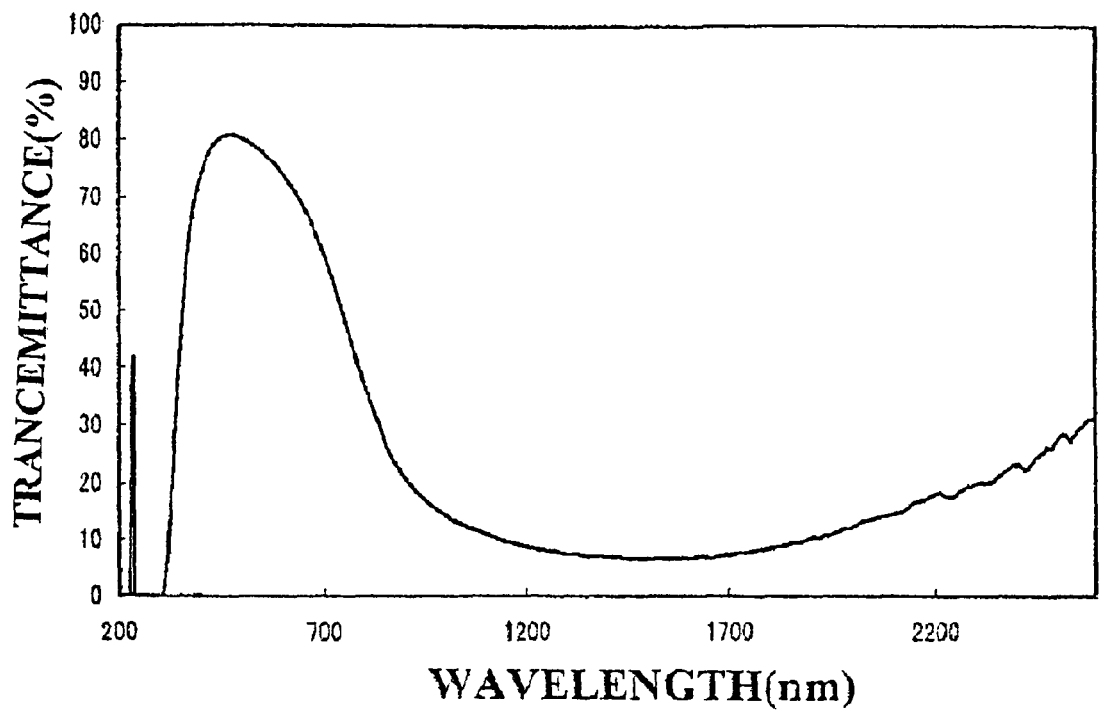
[FIG.4]
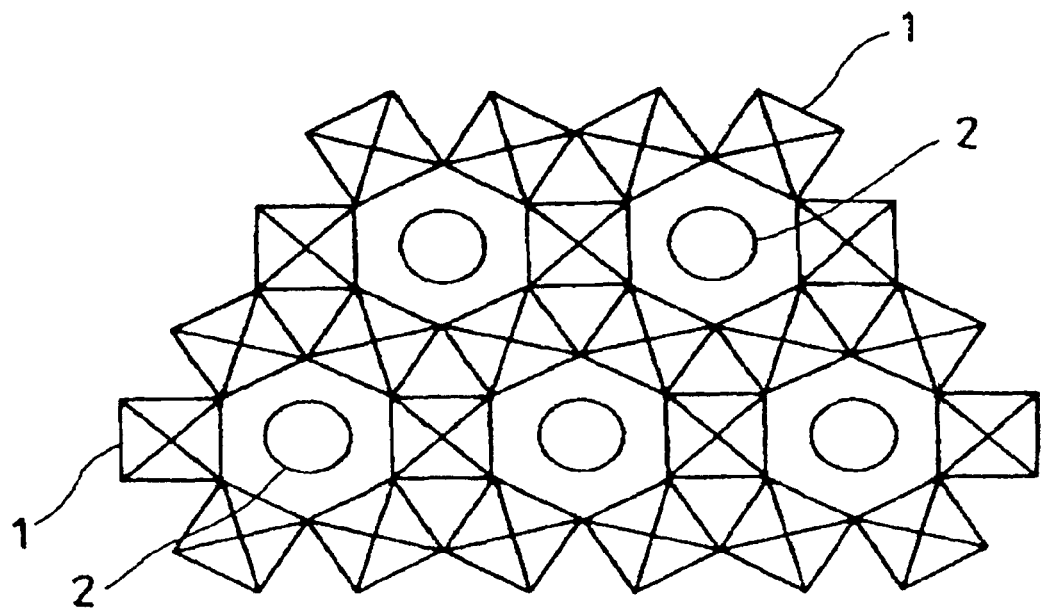

[FIG.5]

| EXAMPLE (No.) | DRYING TEMPERATURE (°C) | REDUCTIVE ATMOSPHERE | HEAT TREATMENT TEMPERATURE (°C) | HEAT TREATMENT TIME (hr) | INERT ATMOSPHERE | HEAT TREATMENT TEMPERATURE (°C) | HEAT TREATMENT TIME (hr) | SPECIFIC SURFACE AREA (m2/g) | VISIBLE LIGHT TRANSMITTANCE (%) | SOLAR RADIATION TRANSMITTANCE (%) | HAZE (%) |
|---|---|---|---|---|---|---|---|---|---|---|---|
| 1 | 130 | Ar+H2 | 550 | 1 | Ar | 800 | 1 | 30 | 61 | 45 | 0.9 |
| 2 | 130 | Ar+H2 | 550 | 1 | Ar | 800 | 1 | 30 | 57 | 42 | 0.9 |
| 3 | 350 | — | — | — | Ar | 980 | 15 | 31 | 58 | 43 | 0.9 |
| 4 | 130 | Ar+H2 | 550 | 1 | Ar | 800 | 1 | 28 | 61 | 45 | 0.9 |
| 5 | 130 | Ar+H2 | 550 | 1 | Ar | 800 | 1 | 30 | 60 | 49 | 0.9 |
| 6 | — | Ar+H2 | 550 | 1 | Ar | 800 | 1 | 35 | 65 | 50 | 0.9 |
| 7 | 130 | Ar+H2 | 550 | 1 | Ar | 800 | 1 | 30 | 65 | 44 | 0.9 |
| 8 | 130 | Ar+H2 | 550 | 1 | Ar | 800 | 1 | 30 | 58 | 42 | 0.7 |
| 9 | 130 | Ar+H2 | 350 | 1 | Ar | 800 | 1 | 30 | 61 | 42 | 0.9 |
| 10 | 130 | — | — | — | Ar | 800 | 1 | 30 | 67 | 49 | 0.9 |
| 11 | 130 | Ar+H2 | 550 | 1 | Ar | 800 | 1 | 30 | 59 | 35 | 0.9 |
| 12 | 130 | Ar+H2 | 550 | 1 | Ar | 800 | 1 | 20 | 72 | 39 | 0.9 |
| 13 | 130 | Ar+H2 | 550 | 1 | Ar | 700 | 1 | 20 | 71 | 42 | 0.9 |
| 14 | 130 | Ar+H2 | 550 | 1 | Ar | 800 | 1 | 20 | 76 | 47 | 0.9 |
| 15 | 130 | Ar+H2 | 450 | 1 | Ar | 800 | 1 | 20 | 68 | 43 | 0.9 |
| 16 | 130 | Ar+H2 | 600 | 1 | Ar | 800 | 1 | 20 | 75 | 54 | 0.9 |
| 17 | — | Ar+H2 | 600 | 1 | Ar | 800 | 1 | 20 | 70 | 36 | 0.9 |
| 18 | — | Ar+H2 | 600 | 1 | Ar | 800 | 1 | 30 | 69 | 40 | 0.9 |
| 19 | — | Ar+H2 | 600 | 1 | Ar | 800 | 1 | 20 | 75 | 53 | 0.9 |

FINE PARTICLE DISPERSION OF INFRARED-SHIELDING MATERIAL, INFRARED-SHIELDING BODY, AND PRODUCTION METHOD OF FINE PARTICLES OF INFRARED-SHIELDING MATERIAL AND FINE PARTICLES OF INFRARED-SHIELDING MATERIAL

TECHNICAL FIELD

The present invention relates to a fine particle dispersion of infrared-shielding material with fine particles of an oxide material which is transparent in a visible region and having an absorption in a near-infrared-shielding region dispersed in a medium, an infrared shielding-body produced by the fine particle dispersion of infrared-shielding material, a production method of fine particles of infrared-shielding material used for the fine particle dispersion of infrared-shielding material, and fine particles of infrared- shielding material produced by the production method of fine particles of infrared-shielding material. Specifically, the present invention relates to the fine particle dispersion of infrared-shielding material formed by dispersing the fine particles of infrared shielding material containing fine particles of tungsten oxides and/or tungsten oxide composite in the medium.

BACKGROUND ART

Patent document 1 proposes a light shielding film used for a window material or the like, containing a black pigment including an inorganic pigment such as carbon black and titanium black having absorption in a region from visible light to near-infrared light, and an organic pigment such as aniline black having strong absorption only in a visible light region. Patent document 2 proposes a half-mirror type light shielding member, which is vapor-deposited with metal such as aluminium.

Patent document 3 proposes a heat ray cut-off glass suitably used at a position requiring high visible ray transmission, having an excellent heat ray cut-off performance, in which a multiple tungsten oxide film as a first layer is provided incorporating at least one kind metal element selected from the group consisting of group IIIa, Iva, Vb, Vib, and VIIb in periodic table, from a substrate side on a transparent glass substrate, and a transparent dielectric film as a second layer on the first layer, and the refractive index of the transparent dielectric film of the second layer is made to be lower than the refractive index of the multiple tungsten oxide film of the first layer or the third layer.

In the same method as that of the patent document 3, patent document 4 proposes the heat ray cut-off glass by laminating the first dielectric film on the glass substrate as the first layer from the substrate side, the tungsten oxide film thereon as the second layer and the second dielectric film further thereon as the third layer.

In the same way as the patent document 3, patent document 5 proposes the heat ray cut-off glass by laminating the tungsten oxide composite film containing the same metal element as the first layer from the substrate side, and laminating the transparent dielectric film on the first layer as the second layer.

Patent document 6 proposes a coated glass sheet for controlling solar light having a solar light-shielding characteristic. This glass sheet is formed by coating a film of a metal oxide by a CVD method or a spraying method and subjecting the film to thermal decomposition at about 250° C. The metal oxide is at least selected from the group consisting of tungsten trioxide ($WO_3$), molybdenum trioxide ($MoO_3$), niobium pentaoxide ($Nb_2O_5$), tantalum pentaoxide ($Ta_2O_5$), vanadium pentaoxide ($V_2O_5$) and vanadium dioxide ($VO_2$) containing additives such as hydrogen, lithium, sodium and potassium.

Patent document 7 proposes a photochromic, heat-insulative material that can undergo rapid coloration/decoloration processes upon exposure to the sunlight and that, when colored, has an absorption peak at 1250 nm and can thus shield the sunlight in the near-infrared region. This material uses a tungsten oxide obtained by hydrolysis of tungsten acid. A specific organic polymer called polyvinylpyrrolidone is added to the tungsten oxide. When the material is exposed to the sunlight, UV-rays contained in the sunlight are absorbed by the tungsten oxide. This results in the generation of excited electrons and holes. As a result, a small dose of UV irradiation can cause the generation of a significant amount of tungsten with a valency of 5, which accelerates the coloring of the material. As the color density of the material increases, the material shields a significant proportion of the sunlight, and the tungsten with a valency of 5 is immediately oxidized to a valency of 6. This in turn causes rapid fading of the color of the material.

The present inventors in Patent document 8 propose a way to obtain tungsten trioxide, a hydrate or a mixture thereof. Specifically, tungsten hexachloride is dissolved in an alcohol. A desired product is given by evaporating the solvent from the mixture, or first refluxing the mixture and then evaporating the solvent, followed by heating the residue at 100° C. to 500° C. The present inventors also propose that fine particles of such a tungsten oxide can be used to fabricate an electrochromic element to form a multi-layer laminate, and when introducing protons in the film, optical characteristics of the film can be changed.

Patent document 9 proposes a method for producing various tungsten bronzes as expressed by the formula: $M_xWO_3$ (where M is a metal element, such as an alkali metal, alkaline earth metal or rare earth metal; satisfying $0<x<1$). This method uses an ammonium meta tungstate and various water-soluble metal salts as starting materials and involves heating an aqueous solution of the reactants at about 300 to 700° C., drying the aqueous mixture to obtain a solid product, and supplying a gaseous hydrogen containing an inert gas (in an amount of approx. 50 vol % or more) or water vapor (in an amount of approx. 15 vol % or less) to the solid material.

[Patent document 1] Japanese Patent Laid-Open Publication No. 2003-029314
[Patent document 2] Japanese Patent Laid-Open Publication No. Hei 9-107815
[Patent document 3] Japanese Patent Laid-Open Publication No. Hei 8-59300
[Patent document 4] Japanese Patent Laid-Open Publication No. Hei 8-12378
[Patent document 5] Japanese Patent Laid-Open Publication No. Hei 8-283044
[Patent document 6] Japanese Patent Laid-Open Publication No. 2000-119045
[Patent document 7] Japanese Patent Laid-Open Publication No. Hei 9-127559
[Patent document 8] Japanese Patent Laid-Open Publication No. 2003-121884
[Patent document 9] Japanese Patent Laid-Open Publication No. Hei 8-73223

DISCLOSURE OF THE INVENTION

Problems to be Solved by the Invention

The black pigment described in Patent document 1 has an absorption peak in the visible region. Thus, when the pigment is used in a window material or the like, the window material tends to have dark colors, and therefore the application is limited.

The window material or the like comprising metal-deposited film described in Patent document 2 is in a half-mirror state in appearance. Therefore, when used outside, such a half-mirror tends to glare due to reflection, posing a problem visually.

The heat ray cut-off materials described in patent documents 3 to 5 are produced mainly by a dry method using a vacuum deposition method, such as sputtering, vapor deposition, ion-plating and chemical vapor deposition (CVD). These production methods require a large scale apparatus and thus a cost is increased. Also, the substrates used for these heat ray cut-off materials are exposed to high temperature plasma and may require heating after film deposition. Thus, when resin materials such as resin films are used as the substrates, facilities and conditions for film deposition must be carefully considered. Furthermore, the tungsten oxide film or the tungsten oxide composite film shown in the aforementioned documents exhibits functions only when such films are formed in multi-layered film with other transparent dielectric film. From this point of view, the present invention is significantly distinguishable from the aforementioned documents.

The coated glass sheet for controlling solar light described in the patent document 6 has a coating film formed by depositing the required material on a glass substrate by using a CVD method or a splaying method in conjunction with thermal deposition. This glass sheet requires costly precursor materials and involves thermal decomposition at high temperatures. For this reason, when resin materials such as resin films are used as the substrates, conditions for film deposition must be carefully considered. Also, the glass sheet must include two or more layers and, therefore, the document 6 essentially differs from the present invention.

The solar-light variable light controllable thermally insulating material and the electrochromic elements described in patent documents 7 and 8 are materials for changing color tones thereof by UV radiation and a difference in electrical potential. Therefore, a film structure is complicated, and it is difficult to be used in an application field where change in color tones is not desired.

Patent document 9, although the production method of tungsten bronze is described therein, mentions nothing about the particle diameter or optical characteristics of the resultant powder. This is perhaps because the tungsten bronze is intended for use as a material for electrodes used in various electrolysis devices or fuel cells or as a material for the catalysts used in organic synthesis, but are not intended for the solar light cut-off purposes as in the present invention.

In order to solve the aforementioned problem, the present invention is provided. An object of the present invention is to provide a fine particle dispersion of infrared-shielding material, an infrared-shielding body which sufficiently transmits a visible light, without having a half mirror appearance, without requiring a large-scale production apparatus during deposition on a substrate, capable of eliminating a heat treatment at high temperature during deposition, efficiently shielding an invisible near-infrared region of 780 nm or longer wavelengths, with no change in color tone, and a production method of the fine particles of infrared-shielding material, and a fine particles of infrared-shielding material thus produced by the production method of the infrared-material fine particles.

Means for Solving the Problem

It is generally known that materials containing free electrons, through the phenomenon called plasma oscillations, reflect and absorb electromagnetic waves in a wavelength region from 200 nm to 2600 nm, that is, in the peripheral part of a sun beam spectrum. When a powder of such a material is made to be a fine particle smaller than the wavelength of light, it is known that high transparency in the visible region can be obtained due to the reduced geometric scattering in the visible region (380 nm to 780 nm). Note that in this specification, the term "transparency" is used in the meaning that the material has high transmittance to the light in the visible region with little scattering.

Meanwhile, it is known that the tungsten oxide expressed by $WO_{3-x}$ and the tungsten bronze added with a positive element such as Na to tungsten trioxide are conductive materials. According to the analyses of a single crystal of these materials, it is suggested that the free electrons respond to light in the infrared region.

The present inventors have conceived that the amount of free electrons present in the infrared-shielding material containing fine particles of the tungsten oxide or the tungsten oxide composite can be increased and, if a particle diameter is set to be from 1 nm to 800 nm, they can function as the infrared-shielding material. The present inventors also have found that, unlike the films fabricated by a dry method including vacuum deposition, such as sputtering, vapor deposition, ion-plating and chemical vapor deposition (CVD) or the film made by CVD and spraying, the film obtained by dispersing the fine particles of the infrared-shielding material in a suitable medium can effectively absorb the sunbeam, particularly in a near-infrared region, without relying on the interference of light and can transmit light in the visible region. These findings ultimately led to the present invention.

Accordingly, the present invention takes several aspects as follows.

In a first aspect, a fine particle dispersion of infrared-shielding material is provided, which is formed by dispersing fine particles of infrared-shielding material in a medium, comprising tungsten oxide fine particles and/or tungsten oxide composite fine particles, wherein a particle diameter of the fine particles of infrared-shielding material is not less than 1 nm and not more than 800 nm.

In a second aspect, the fine particle dispersion of infrared-shielding material according to the first aspect is provided, wherein the tungsten oxide fine particle is the fine particle of a tungsten oxide expressed by a general formula: WyOz (where W is tungsten, O is oxygen, satisfying $2.2 \leq z/y \leq 2.999$).

In a third aspect, the fine particle dispersion of infrared-shielding material according to the first aspect is provided, wherein the tungsten oxide composite is fine particles of the tungsten oxide composite expressed by the general formula: MxWyOz (where M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying $0.001 \leq x/y \leq 1$; and $2.2 \leq z/y \leq 3.0$.).

In a fourth aspect, the fine particle dispersion of infrared-shielding material according to any one of the first aspect to third aspect is provided, wherein the tungsten oxide fine particles and/or the tungsten oxide composite fine particles comprise a Magnéli phase expressed by the general formula: WyOz (where W is tungsten, O is oxygen, satisfying $2.45 \leq z/y \leq 2.999$).

In a fifth aspect, the fine particle dispersion of infrared-shielding material according to the third aspect is provided, wherein the fine particle of the tungsten oxide composite expressed by the general formula MxWyOz comprises at least more than one kind of fine particle of hexagonal, tetragonal, cubic crystal structure or amorphous structure.

In a sixth aspect, the fine particle dispersion of infrared-shielding material according to the third aspect is provided, wherein some of the fine particles of the tungsten oxide composite expressed by the general formula MxWyOz or all of them have a hexagonal crystal structure.

In a seventh aspect, the fine particle dispersion of infrared-shielding material according to the third aspect is provided, wherein the element M is more than one kind of element selected from the group consisting of Cs, Rb, K, Tl, In, Ba, Li, Ca, Sr, Fe and Sn.

In an eighth aspect, the fine particle dispersion of infrared-shielding material according to any one of the first aspect to seventh aspect is provided, wherein the fine particles of infrared-shielding material are coated with oxide containing more than one kind of element selected from the group consisting of Si, Ti, Zr and Al.

In a ninth aspect, the fine particle dispersion of infrared-shielding material according to any one of the first aspect to eighth aspect is provided, wherein the medium is resin or glass.

In a tenth aspect, the fine particle dispersion of infrared-shielding material according to the ninth aspect is provided, wherein the resin is more than one kind of element selected from the group consisting of polyethylene resin, polyvinyl chloride resin, polyvinylidene chloride resin, polyvinyl alcohol resin, polystyrene resin, polypropylene resin, ethylene-vinyl acetate copolymer, polyester resin, polyethylene terephthalate resin, fluorine resin, polycarbonate resin, acrylic resin and polyvinyl butyral resin.

In an eleventh aspect, an infrared-shielding body is provided, wherein the fine particle dispersion of infrared-shielding material according to any one of the first aspect to tenth aspect is formed in a plate shape, in a film shape, and in a thin film shape.

In a twelfth aspect, a production method of fine particles of infrared-shielding material is provided, containing tungsten oxide fine particles expressed by a general formula: WyOz (where W is tungsten, O is oxygen, satisfying $2.2 \leq z/y \leq 2.999$) and/or tungsten oxide composite fine particles expressed by the general formula: MxWyOz (where M is at least one kind of element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying $0.001 \leq x/y \leq 1$, and $2.2 \leq z/y \leq 3.0$.), the method comprising the step of:

heating a starting material of the fine particles of infrared-shielding material in a reductive gas and/or inert gas atmosphere.

In a thirteenth aspect, the production method of the fine particles of infrared-shielding material according to the twelfth aspect is provided, wherein a starting material of the fine particles of infrared-shielding material is heated at 100° C. to 850° C. in a reductive gas atmosphere and subsequently heated at 650° C. to 1200° C. in an inert gas atmosphere.

In a fourteenth aspect, the production method of the fine particles of infrared-shielding material according to either of the twelfth aspect or the thirteenth aspect is provided, wherein the starting material of the tungsten oxide fine particle expressed by the general formula WyOz is more than one kind of powder selected from the group consisting of:

a tungsten trioxide powder;
a tungsten dioxide powder;
a powder of tungsten oxide hydrate;
a tungsten hexachloride powder;
an ammonium tungstate powder;
a powder of tungsten oxide hydrate obtained by dissolving tungsten hexachloride in an alcohol and then drying the solution;
a powder of tungsten oxide hydrate obtained by dissolving tungsten hexachloride in an alcohol, adding water to the solution to form a precipitate, and drying the precipitate;
a powder of tungsten compound obtained by drying an aqueous solution of ammonium tungstate; and
a metal tungsten powder.

In a fifteenth aspect, the production method of the fine particles of infrared-shielding material according to either of the twelfth aspect or the thirteenth aspect is provided, wherein the starting material of the fine particles of the tungsten oxide composite expressed by the general formula: MxWyOz is a powder obtained by mixing a powder of the element M or a compound containing the element M with more than one kind of powder selected from the group consisting of:

a tungsten trioxide powder;
a tungsten dioxide powder;
a powder of tungsten oxide hydrate;
a tungsten hexachloride powder;
an ammonium tungstate powder;
a powder of tungsten oxide hydrate obtained by dissolving tungsten hexachloride in an alcohol and then drying the solution;
a powder of tungsten oxide hydrate obtained by dissolving tungsten hexachloride in an alcohol, adding water to the solution to form a precipitate, and drying the precipitate;
a powder of tungsten compound obtained by drying an aqueous solution of ammonium tungstate; and
a metal tungsten powder.

In a sixteenth aspect, the production method of the fine particles of infrared-shielding material according to either of the twelfth aspect or the thirteenth aspect is provided, wherein the starting material of the fine particle of the tungsten oxide composite expressed by the general formula MxWyOz is a powder obtained by mixing an alcohol solution of tungsten hexachloride or an aqueous solution of ammonium tungstate with a solution of a compound containing the element M, and drying the mixture.

In a seventeenth aspect, the production method of the fine particles of infrared-shielding material according to either of the twelfth aspect or the thirteenth aspect is provided, wherein the starting material of the fine particles of the tungsten oxide composite expressed by the general formula MxWyOz is a powder obtained by:

mixing a dispersion solution obtained by dissolving tungsten hexachloride in alcohol and forming a precipitate by adding water, with a single powder or a compound containing the element M, or a solution of the compound containing the element M, and thereafter drying a mixture thus obtained.

In an eighteenth aspect, fine particles of infrared-shielding material are provided, comprising tungsten oxide fine particles expressed by a general formula WyOz (where W is tungsten, O is oxygen, satisfying $2.2 \leq z/y \leq 2.999$) obtained by the method according to any one of the twelfth to the seventeenth aspects and/or the fine particles of tungsten oxide composite expressed by the general formula MxWyOz (where M is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying $0.001 \leq x/y \leq 1$; and $2.2 \leq z/$ y≦3.0.) obtained by the method according to any one of the twelfth to the seventeenth aspects.

ADVANTAGE OF THE INVENTION

According to the present invention, fine particles of infrared-shielding material containing the tungsten oxide fine particles and/or the tungsten oxide composite fine particles are finely granulated to a particle size of not less than 1 nm and not more than 800 nm. The fine particles of infrared-shielding material thus obtained is dispersed in a medium, and a fine particle dispersion of infrared-shielding material can be fabricated, having excellent characteristics such as efficiently shielding the sunbeam, especially the light in the near-infrared region, while holding a transmittance to the visible region, compared to the film fabricated by a dry method including a vacuum deposition method such as a sputtering method, a vapor deposition, an ion- plating and a chemical vapor deposition (CVD), or the film made by CVD and spraying. In addition, when producing the infrared-shielding body by using the fine particle dispersion of infrared-shielding material, an inexpensive infrared-shielding body can be produced without using a large-scale apparatus such as a vacuum apparatus, and an industrially useful infrared-shielding dispersion material is thereby obtained.

BEST MODE FOR CARRYING OUT THE INVENTION

In the fine particle dispersion of infrared-shielding material of the present invention, fine particles of infrared-shielding material containing tungsten oxide fine particles and/or tungsten oxide composite fine particles are used. Each particle diameter of the fine particles of infrared-shielding material is not less than 1 nm and not more than 800 nm, and fine particles are dispersed in a proper medium as will be described later.

The fine particles of infrared-shielding material and the fine particle dispersion of infrared-shielding material will now be described in detail.

1. Infrared-shielding Material

Generally, there are no effective free electrons in tungsten trioxide ($WO_3$), and therefore little absorption/reflection characteristic is exhibited in a near-infrared region. This makes tungsten trioxide unsuitable for use as an infrared-shielding material. It is known that free electrons are generated in a tungsten oxide if the ratio of oxygen to tungsten present in the tungsten trioxide is smaller than 3. The present inventors discovers that the tungsten oxide containing tungsten and oxygen in a certain composition range is particularly suitable as the infrared-shielding material.

The ratio of oxygen to tungsten in a tungsten oxide is preferably equal to or smaller than 3. More specifically, it is preferable that the tungsten oxide is expressed by $WyOz$ so as to satisfy $2.2 \leq z/y \leq 2.999$. If the value of z/y is 2.2 or larger, an unexpected $WO_2$ is prevented from forming in the tungsten oxide, and at the same time, the chemical stability of the tungsten oxide can be ensured as a starting material. This makes the tungsten oxide an effective infrared-shielding material. If the value of z/y is 2.999 or smaller, then a required amount of free electrons is generated in the tungsten oxide, and an effective infrared shielding material is thereby obtained.

Also, when the tungsten oxide fine particles, which are obtained by granulating the tungsten oxide to fine particles, are expressed by the general formula $WyOz$, a so-called "Magéli phase" having a composition ratio satisfying $2.45 \leq z/y \leq 2.999$ is chemically stable and has an excellent absorption property in the near-infrared region, and therefore is preferable as the infrared-shielding material.

By adding an element M (M is more than one kind of element selected from the group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I) to the tungsten oxide, a tungsten oxide composite is obtained. Then, in the tungsten oxide composite thus obtained, free electrons are generated, and an absorption property, which results from the free electrons, is exhibited. This makes the tungsten oxide composite effective as a near-infrared absorption material in the wavelength region of 1000 nm or around. In view of the stability in the tungsten oxide composite, however, it is further preferable that the element M is more than one kind of element selected from the group consisting of Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I. Also, from the viewpoint of improving an optical characteristic and a weather characteristic as the infrared-shielding material, it is further preferable that the element M is selected from the group consisting of alkali metal, alkaline earth metal, transitional metal, and group 4B and group 5B elements.

By controlling an amount of oxygen and adding the element to generate the free electrons at the same time for the tungsten oxide composite, even more effective infrared-shielding materials can be obtained. When control of the amount of oxygen and adding the element to generate the free electrons are conducted at the same time, it is preferable that the infrared-shielding material is expressed by the general formula $MxWyOz$ (where M is the above-described element M, W is tungsten, and O is oxygen), satisfying $0.001 \leq x/y \leq 1$; and $2.2 \leq z/y \leq 3.0$.

First, a value of x/y showing an amount of the element M to be added will be explained. When the value of the x/y is larger than 0.001, a sufficient amount of free electrons are generated, and by a greater amount of element M to be added, a supply amount of the free electrons is increased, thereby also increasing infrared-shielding effect, while the infrared-shielding effect is saturated at the x/y value of about 1. When the value of x/y is smaller than 1, preferably an impurity phase is prevented from generating in the infrared-shielding material. Also, it is preferable that the element M is more than one kind of element selected from the group consisting of H, He, alkali metal, alkaline earth metal, rare earth metal, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I. From the viewpoint of stability in the $MxWyOz$ added with the element M, it is further preferable that the element M is more than one kind of element selected from the group consisting of alkali metal, alkaline earth metal, and rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta and Re. In addition, from the viewpoint of improving the optical characteristic and the weather stability as the infrared-shielding material, the element M is more than one kind of element selected from the group consisting of alkali metal, alkaline earth metal, transitional metal, and group 4B and group 5B elements.

Next, the value of z/y showing the control of an amount of oxygen will be explained. Preferably, the value of z/y is selected to satisfy $2.2 \leq z/y \leq 3.0$, because the same mechanism as the aforementioned infrared-shielding material expressed by $WyOz$ works in the infrared-shielding material expressed by MxWyOz, and the free electrons are supplied by adding the element M, even when the value of z/y is selected to be z/y=3.0.

Further, when the aforementioned tungsten oxide composite fine particle has a hexagonal crystal structure, transmittance of the fine particle in the visible light region is improved, and the absorption in the near-infrared region is improved. Then, explanation will be given to a structure, with reference to FIG. 4, which is a schematic plan view of the hexagonal crystal structure. As shown in FIG. 4, six octahedrons, each comprising a $WO_6$ unit (denoted by reference numeral 1), form a cluster with a hexagonal space (tunnel). An element M (denoted by reference numeral 2) is disposed in the hexagonal space to form a single unit. Many of these units are assembled into a hexagonal crystal structure.

In order to obtain an advantage of improving the transmittance in the visible light region and improving the absorbance in the near-infrared region according to the present invention, preferably some of the fine particles of the tungsten oxide composite may have a unit structure explained in FIG. 4 (structure in which six octahedrons, each comprising a $WO_6$ unit, form a cluster with a hexagonal space, and element M is arranged in the space), and the tungsten oxide composite fine particle may be either crystalline or amorphous.

When positive ion of the element M is added to exist in the hexagonal space, absorption in the near-infrared region is improved. Generally, when the element M having a large ionic radius is added, the hexagonal crystal is formed. Specifically, more than one kind of element selected from the group consisting of Cs, Rb, K, Tl, In, Ba, Li, Ca, Sr, Fe and Sn are added, and preferably the hexagonal crystal is ready to be formed. However, the elements are not limited thereto, and any other element may be suitable if the element M to be added is present in the hexagonal space formed by the $WO_6$ units.

When the tungsten oxide composite fine particle with a hexagonal structure has a uniform crystal structure, it is preferable that x/y value of an amount of the element M to be added is not less than 0.2 and not more than 0.5, and further preferably is 0.33. By setting the z/y value and x/y value to be z/y=3, and x/y=0.33, the element M to be added is considered to be arranged in every hexagonal space.

Similarly, when z/y value is expressed by z/y=3, each of the composite tungsten compound having a crystalline structure of a cubic crystal or a tetragonal crystal has an upper limit of an amount of the element M to be added due to the structure. (The term, "Cubic crystal structure" specified in this specification is used as a representative of tungsten bronze structures classified as a Cubic tungsten bronze structure type or a Perovskite tungsten bronze structure type in the general classification of the tungsten bronze structure. Also, the term, "Tetragonal crystal structure" specified in this specification is used as a representative of the tungsten bronze structures classified as a Tetragonal tungsten bronze structure type in the general classification of the tungsten bronze structure. Further, the term, "Hexagonal crystal structure" specified in this specification is used as a representative of the tungsten bronze structures classified as a Hexagonal tungsten bronze structure type in the general classification of the tungsten bronze structure.) Therefore, the maximum addition amount of the element M to be added to 1 mol tungsten is 1 mol for the cubic crystal structure, and is about 0.5 mol for the tetragonal crystal structure (although the maximum addition amount is varied depending on the kind of the element M, it is about 0.5 mol, for industrially facilitating production of the composite tungsten compound). However, it is difficult to simply define the aforementioned structure, and a basic scope is given as an example in particular in the present invention, and therefore the present invention is not limited thereto.

The aforementioned tungsten oxide composite fine particles are effective as the infrared-shielding material, even when the tungsten oxide composite fine particles have a tungsten bronze of cubic crystal structure or tetragonal crystal structure, other than the aforementioned hexagonal crystal structure. Depending on the crystal structure of the tungsten oxide composite fine particles, an absorption position in the near-infrared region is changed. Specifically, in regards to the absorption position in the near-infrared region, the tetragonal crystal structure is shifted to the longer wavelength side than the cubic crystal structure, and the hexagonal crystal structure is further shifted to the longer wavelength side than the tetragonal crystal structure. Further, in association with the change in the absorption position, the absorption in the visible light region is minimum in the hexagonal crystal structure, followed by the tetragonal crystal structure, and the absorption becomes maximum in the cubic crystal structure among these crystal structures. Thus, tungsten bronzes composed of hexagonal crystals are most suitable for applications where it is desired to transmit as much light in the visible range and shut as much light in the infrared range as possible. It should be noted, however, that the described optical characteristics of the infrared-shielding material only reflect general tendencies and actual optical characteristics of the material may vary depending on the type and amount of the additive element or the oxygen content in the tungsten oxide composite. Such variations are also within the scope of the invention.

The infrared-shielding material according to the present invention, containing the tungsten oxide fine particles and/or tungsten oxide composite fine particles largely absorbs the light in the wavelength region of 1000 nm or around in particular, and therefore in many cases, the transmission tone becomes blue to green. The particle diameter of the particles of the infrared-shielding material can be selected in various ways depending upon purposes of use. When the infrared-shielding material is applied so as to retain transparency, the particle diameter is preferably set to be 800 nm or less. This is because in case of the particle diameter smaller than 800 nm, the light is not completely interrupted by scattering, and therefore good visibility in the visible light region is maintained, and the transparency can be simultaneously effectively maintained. When the transparency in the visible region is important, it is preferable to take scattering by particles into consideration.

When scattering by particles is important, particle diameter is preferably set to be 200 nm or less, further preferably set to be 100 nm or less. The reason is that when the particle diameter is small, scattering of the light in the visible light region of the wavelength from 400 nm to 780 nm is reduced by geometrical scattering and Mie scattering, and as a result, it is prevented that the infrared-shielding film becomes in the appearance of smoky glass, thus making it impossible to obtain a clear transparency. Specifically, when the particle diameter becomes 200 nm or less, the aforementioned geometrical scattering or Mie scattering is reduced, to become a Rayleigh scattering region. In the Rayleigh scattering region, scattered lights are reduced in inverse proportion to 6 times multiplication of the particle diameter, and therefore in association with reduction in particle diameter, scattering is reduced, and transparency is thereby improved. Further, when the particle diameter is 100 nm or more, preferably the scattered lights are extremely reduced. From the viewpoint of preventing the scattering of the lights, small particle diameter is preferable. Particles sized 1 nm or larger can be easily produced on an industrial scale.

When the particle diameter is selected to be 800 nm or less, a haze value of the fine particle dispersion of infrared-shielding material, with the fine particles of infrared-shielding material dispersed in the medium, is 85% or less in visible light transmittance, thereby suppressing the haze to be 30% or less. When the haze is larger than 30%, the infrared-shielding film becomes in the appearance of smoky glass, and therefore a clear transparency can not be obtained.

It is not preferable from the viewpoint of improving weather stability of the infrared-shielding material that a surface of the fine particle of the infrared-shielding material of the present invention is coated with an oxide containing more than one kind of element selected from Si, Ti, Zr, and Al.

2. Production of Fine Particles of Infrared-shielding Material

The tungsten oxide fine particles expressed by the aforementioned general formula $W_yO_z$ (where W is tungsten, O is oxygen, satisfying $2.2 \leq z/y \leq 2.999$), and/or the fine particles of infrared-shielding material containing the tungsten oxide composite fine particles expressed by general formula $M_xW_yO_z$ (where M is more than one kind of element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten, O is oxygen, satisfying $0.001 \leq x/y \leq 1$ and $2.2 \leq z/y \leq 3.0$.) can be obtained by subjecting the tungsten compound as the starting material of the tungsten oxide fine particles and/or the tungsten oxide composite fine particles to heat treatment in an inert gas or reductive gas atmosphere. The tungsten oxide fine particles and the tungsten oxide composite fine particles obtained through the heat treatment have a sufficient near-infrared absorption, and have a preferable property as the fine particles of infrared-shielding material.

Preferably, the tungsten compound as the starting material is more than one tungsten powder selected from the group consisting of tungsten trioxide powder, tungsten dioxide powder, hydrate of tungsten oxide, tungsten hexachloride powder, ammonium tungstate powder, powder of tungsten oxide hydrate obtained by dissolving tungsten hexachloride in an alcohol and drying the solution, powder of tungsten oxide hydrate obtained by dissolving tungsten hexachloride in an alcohol, adding water to the solution to form a precipitate, and drying the precipitate, powder of tungsten compound obtained by drying an aqueous solution of ammonium tungstate; and metal tungsten powder.

When the tungsten oxide fine particles are produced, it is further preferable to use powder of tungsten oxide hydrate, tungsten trioxide, or powder of tungsten compound obtained by drying an aqueous solution of ammonium tungstate, from the viewpoint of facilitating the production step. In addition, when the tungsten oxide composite fine particles are produced, it is preferable to use an aqueous solution of ammonium tungstate or an aqueous solution of tungsten hexachloride from the viewpoint of permitting uniform mixture of each element. By using such starting materials, the heat treatment is applied thereto in an inert gas atmosphere or a reductive gas atmosphere, to obtain the fine particles of infrared-shielding material containing the aforementioned tungsten oxide fine particles and/or the tungsten oxide composite fine particles.

The starting material of the fine particles of infrared-shielding material containing the tungsten oxide composite fine particles expressed by the general formula $M_xW_yO_z$ containing the element M is the same tungsten compound as the starting material of the fine particles of infrared-shielding material containing the tungsten oxide fine particles expressed by the general formula $W_yO_z$. However, in the fine particles of infrared-shielding material, the tungsten compound containing the element M in the form of a single element or a compound thereof is selected as the starting material. In order to produce the tungsten compound as a starting material in which each component is uniformly mixed in a molecular level, it is preferable to mix each material with a solution, so that the tungsten compound containing the element M is dissolvable in a solvent such as water and an organic solvent. Tungstates, chlorides, nitrates, sulfates, oxalates, oxides, carbonates, and hydroxides containing the element M are given as examples of the tungsten compound. However, the tungsten compound is not limited thereto, and the tungsten compound in a state of a solution like liquid is preferable.

A source material for producing the tungsten oxide fine particles and the tungsten oxide composite fine particles will be explained in detail hereunder.

As the tungsten compound serving as a starting material for obtaining the tungsten oxide fine particles expressed by the general formula $W_yO_z$, it is possible to use more than one tungsten compound selected from the group consisting of tungsten trioxide powder; tungsten dioxide powder; hydrate of tungsten oxide; tungsten hexachloride powder; ammonium tungstate powder; powder of tungsten oxide hydrate obtained by dissolving tungsten hexachloride in an alcohol and drying the solution; powder of tungsten oxide hydrate obtained by dissolving tungsten hexachloride in an alcohol, adding water to the solution, forming a precipitate, and drying the precipitate; powder of tungsten compound obtained by drying an aqueous solution of ammonium tungstate; and metal tungsten powder. From the viewpoint of facilitating the production step, it is more preferred to use powder of tungsten oxide hydrate, tungsten trioxide powder, or powder of tungsten compound obtained by drying an aqueous solution of ammonium tungstate.

As the starting material for obtaining the tungsten oxide composite fine particles expressed by the general formula $M_xW_yO_z$ containing the element M, it is possible to use a mixed powder of a powder of more than one tungsten compound selected from tungsten trioxide powder; tungsten dioxide powder; hydrate of tungsten oxide; tungsten hexachloride powder; ammonium tungstate powder; powder of tungsten oxide hydrate obtained by dissolving tungsten hexachloride in an alcohol and drying the solution; powder of tungsten oxide hydrate obtained by dissolving tungsten hexachloride in an alcohol, adding water to the solution, forming a precipitate, and drying the precipitate; powder of tungsten compound obtained by drying an aqueous solution of ammonium tungstate; and metal tungsten powder, and a single powder or a compound thereof containing the element M.

Further, when the tungsten compound as a starting material for obtaining the tungsten oxide composite fine particles is in the appearance of solution or dispersion solution, each element can be easily uniformly mixed.

From this point of view, the starting material of the fine particles of the tungsten oxide composite is more preferably a powder obtained by mixing an alcohol solution of tungsten hexachloride or an aqueous solution of ammonium tungstate with a solution of a compound containing element M, and then drying the mixture.

Similarly, it is also preferable that the starting material of the fine particles of the composite tungsten is a powder obtained by mixing a dispersion solution obtained by dissolving tungsten hexachloride in an alcohol and then adding water to form a precipitate, a single powder or a compound thereof containing the element M, or the solution of the compound containing the element M, and thereafter drying the mixture.

Examples of the compound containing element M are tungstates, chlorides, nitrates, sulfates, oxalates, oxides, carbonates, and hydroxides of the element M. However, the compound is not limited thereto, and the compound that can be solution-like state may be used. Further, when a powder of tungsten oxide hydrate or tungsten trioxide, and a carbonate or hydroxide containing the element M are used for industrially producing the tungsten oxide composite fine particles, a preferable production method can be obtained without generating a toxic gas or the like.

Preferably, the starting material of fine particles of the tungsten oxide or the tungsten oxide composite is heated in an inert atmosphere at 650° C. or higher temperature. The starting material thus subjected to heat treatment at 650° C. or more has a high absorption in the near-infrared region, and has a good efficiency as the fine particles of infrared-shielding material. The inert gas such as Ar and $N_2$ and so forth are preferably used. As a condition of the heat treatment in the reductive gas atmosphere, preferably, the starting material is subjected to heat treatment first in the reductive gas atmosphere at not less than 100° C. and not more than 850° C., and if necessary, subsequently subjected to heat treatment at not less than 650° C. and not more than 1200° C. in the inert atmosphere. Preferably, the reductive gas at this time is not particularly limited, however $H_2$ is preferable. When used as the reductive gas, $H_2$ is preferably present in the reductive atmosphere at a volume ratio of 0.1% or more and, more preferably, 2% or more. $H_2$ present at a volume ratio of 0.1% or more is sufficient for effective reduction.

The hydrogen-reduced tungsten oxide fine particle includes a Magnéli phase, exhibiting a good infrared-shielding characteristic, and in this state, can be used as the infrared-shielding fine particles. However, residual hydrogen in the tungsten oxide is unstable, and therefore application is possibly limited in terms of the weather stability. Therefore, this tungsten oxide containing hydrogen is subjected to heat treatment at 650° C. or more in the inert atmosphere, thus obtaining further stable fine particles of infrared-shielding materials. The atmosphere in which the heat treatment is applied at 650° C. or more is not particularly limited. However, from the industrial viewpoint, $N_2$ and Ar are preferable. By the heat treatment at 650° C. or more, the Magnéli phase can be obtained in the fine particles of infrared-shielding material, and the weather stability is improved.

It is preferable that the surface of the fine particles of infrared-shielding material thus obtained in the aforementioned step is coated with an oxide containing the metal of more than one kind of element selected from Si, Ti, Zr and Al, in terms of improving the weather stability. A coating method is not particularly limited, however the surfaces of the fine particles of infrared-shielding material can be coated by adding an alkoxide of the aforementioned metal into the solution in which the fine particles of infrared-shielding material are dispersed.

3. Infrared-shielding Dispersion Material

In one application of the fine particles of the infrared-shielding material of the present invention, the fine particles are dispersed in a proper medium and the resulting material is applied to the surface of a desired substrate. In this method, the fine particles of the infrared-shielding material, which is previously baked, can be dispersed into or on the substrate so as to be stuck thereto by a binder. Therefore, this method can be applied to a substrate material such as a resin material having a lower heat-resistive temperature, and has an advantage that a large-scale apparatus is not required during deposition, and a cost can be reduced.

The infrared-shielding material according to the present invention is a conductive material, and therefore when used as a continuous film, radio waves of a cellular phone or the like are absorbed, reflected, and blocked by such a film. However, the infrared-shielding material has general-purpose properties when dispersed as particles in a matrix, because the particles are dispersed in an individually separated state, and transmissivity to radio waves is thereby exhibited.

(a) Method of Forming a Thin Film on a Substrate Surface by Dispersing Fine Particles in a Medium.

For example, the fine particles of the infrared-shielding material obtained by finely granulating the infrared-shielding material according to the present invention are dispersed in a proper medium, to obtain a dispersion solution of the fine particles of the infrared-shielding material. Alternately, the infrared-shielding material is mixed with the proper medium, and the mixture thus obtained is wet-ground, to obtain the dispersion solution of the fine particles of the infrared-shielding material. A resin medium is added to the dispersion solution of the fine particles of the infrared-shielding material thus obtained, so that the substrate surface is coated. Then, the solvent is evaporated, and the resin is cured by a predetermined method, thus allowing a thin film to be formed thereon, with fine particles of the infrared-shielding material dispersed in the medium. A method of coating is not particularly limited thereto, and the resin containing the fine particles of the infrared-shielding material may be uniformly applied on the substrate surface. Bar coating, gravure coating, spray coating and dip coating, and so forth are given as examples. When the fine particles of the infrared-shielding material are directly dispersed in a binder resin, the solvent is not required to be evaporated after applying on the substrate surface. This is environmentally and industrially favorable.

The medium can be selected from resins such as a UV-curable resin, a thermosetting resin, an electron beam-curable resin, a room temperature-curable resin and a thermoplastic resin, according to the purpose. Specifically, for example, the resins include a polyvinyl chloride resin, polyvinylidene chloride resin, polyvinyl alcohol resin, polystyrene resin, polypropylene resin, ethylene-vinyl acetate copolymer, polyester resin, polyethylene terephthalate resin, fluorine resin, polycarbonate resin, acrylic resin and polyvinyl butyral resins. These resins may be used either individually or as a mixture. A binder using a metal alkoxide may also be used. As the metal alkoxide, alkoxides such as Si, Ti, Al and Zr are typically given as examples. Among such metal alkoxides are alkoxides of Si, Ti, Al and Zr. The binders using such a metal alkoxide are subjected to hydrolysis/condensation by, for example, heating and an oxide film is thereby formed.

The shape of the substrate is not limited, and the substrate may be formed in a film or in a plate if desired. The substrate may be made of a transparent material, such as PET, acryl, urethane, polycarbonate, polyethylene, ethylene-vinyl acetate copolymer, vinyl chloride and fluorine resin. The material is properly selected depending on the intended purposes. In addition to the resins, glass may also be used.

(b) Method of Dispersing in the Substrate as Fine Particles

As another method to use the infrared-shielding material according to the present invention as fine particles, the fine particles may be dispersed in the substrate. In order to disperse the fine particles in the substrate, the fine particles may be allowed to permeate from the surface of the substrate, or the substrate may be melted by heating above the melting point and the molten material is mixed with the fine particles.

The resulting resin containing the fine particles is shaped into a film or a plate (board) and is used as the infrared-shielding material.

For example, in a method of dispersing the fine particles in a PET resin, the PET resin and the fine particles dispersion solution are mixed, and then the dispersion solvent is evaporated. Thereafter, the fine particles can be dispersed in a PET resin as follows: A PET resin is first mixed with a dispersion solution of the fine particles. The solvent is evaporated and the remaining material is heated to approximately 300° C., which is a melting point of PET resin, to melt the PET resin. By cooling the material, a PET resin with the fine particles dispersed in it can be obtained.

The method of pulverizing and dispersing the particles of the infrared shielding material is not particularly limited, and for example, ultrasonic irradiation, a beads-mill and a sand mill or the like can be used. In order to obtain a uniform dispersing body, various additives and dispersants may be added, and pH may be regulated. The dispersant may be selected in accordance with the purpose of use, and for example, a polymer-based dispersant, a silane coupling agent, a titanate coupling agent and an aluminum-based coupling agent are given as examples, although not limited thereto.

4. Optical Characteristics of the Particle Dispersion of the Infrared-shielding Material Optical characteristics of the fine particle dispersion of the infrared shielding material were measured, based on a film of a window glass for construction JIS A 5759(1998) (Light source: light A), and a visible light transmittance and a solar radiation transmittance were computed. The film samples were directly used without applying to the window glass. The haze value was determined according to JIS K 7105. The average size of the dispersed particles was measured by a dynamic light scattering spectrometer ELS-800 (Otsuka Electronics Co., Ltd.).

As an example of the results of the analysis, a transmission profile of a fine particle dispersion film of $W_{18}O_{49}$ is shown in FIG. 1, in which the horizontal axis represents the wavelength of light and the vertical axis represents the transmittance of light (%). As can be seen from FIG. 1, the dispersion film of $W_{18}O_{49}$ according to the present invention transmits light in the visible range from 380 nm to 780 nm (for example, the transmittance to visible light with a wavelength of 500 nm is 60% and infrared rays with the wavelength from 1000 nm or around to more than 1000 nm is selectively absorbed, which is the region of invisible ray (for example, the transmittance of the infrared ray of 1000 nm wavelength is 18%, and the transmittance of the infrared-ray of 1250 nm wavelength is 15%). Thus, it was found that the aforementioned fine particle dispersion film had an excellent infrared-shielding characteristic such that transparency was exhibited to the light in the visible region, and an absorption property was exhibited to the light in the infrared region.

FIG. 2 shows an exemplary transmittance profile of the dispersion film containing the fine particles of tungsten oxide composite ($Cs_{0.33}WO_3$) composed of hexagonal crystals. As can be seen from FIG. 2, in which the horizontal axis represents the wavelength of light and the vertical axis represents the transmittance of light (%), the dispersion film of $Cs_{0.33}WO_3$ according to the present invention transmits light in the visible range from 380 nm to 780 nm (for example, the transmittance of the visible light of 500 nm wavelength is 79.5%) and preferentially absorbs infrared ray in the range of 1000 nm or longer wavelengths, which is an invisible heat ray (for example, the transmittance of infrared ray of 1000 nm wavelength is 19.0% and the transmittance of infrared ray of 1250 nm wavelength is 12.9%). This indicates that the dispersion film has superior infrared-shielding characteristics: it transmits light in the visible range and absorbs light in the infrared range.

FIG. 3 shows another exemplary transmittance profile of the dispersion film containing the fine particles of tungsten oxide composite ($Rb_{0.33}WO_3$) composed of hexagonal crystals. As can be seen from FIG. 3, in which the horizontal axis represents the wavelength of light and the vertical axis represents the transmittance of light (%), the dispersion film of $Rb_{0.33}WO_3$ according to the present invention transmits light in the visible range from 380 nm to 780 nm (for example, the transmittance of the visible light of 500 nm wavelength is 80.0%) and preferentially absorbs infrared ray in the range of 1000 nm or longer wavelengths, which is an invisible heat ray (for example, the transmittance of infrared ray of 1000 nm wavelength is 14.32% and the transmittance of infrared ray of 1250 nm wavelength is 8.0%). This indicates that the dispersion film has superior infrared-shielding characteristics: it transmits light in the visible range and absorbs light in the infrared range.

The present invention will specifically explained with reference to examples, however the present invention is not limited thereto. An optical measurement in the examples and comparative examples are conducted based on the film of window glass for construction JIS A 5759 (light source: light A), and the visible light transmittance and the solar radiation transmittance were computed. Film samples were directly used without applying to the window glass. The haze value was determined according to JIS K 7105. The average size of the dispersed particles was measured by a dynamic light scattering spectrometer ELS-800 (Otsuka Electronics Co., Ltd.).

A PET film HPE-50 (Teijin Co., Ltd.) was used as the substrate in each of examples and was determined to have the following optical characteristics: visible light transmittance=89%; solar radiation transmittance=89%; and haze=0.8%.

EXAMPLE 1

Tungsten hexachloride and copper dichloride were each weighed so that the molar ratio of W to Cu was 1:0.2. Each compound was dissolved in small portions in ethanol to obtain a mixture solution. The mixture solution was dried at 130° C. to obtain a starting material in a powder form. This starting material was heated at 550° C. in a reductive atmosphere (argon/hydrogen=95/5 by volume) for 1 hour, then cooled to room temperature, and heated at 800° C. for one hour in an argon atmosphere, thus producing powder of $Cu_{0.2}WO_{2.72}$. An X-ray diffraction crystallography performed on the resultant $Cu_{0.2}WO_{2.72}$ revealed the presence of crystalline phase of $W_{18}O_{49}$. The specific surface area of $Cu_{0.2}WO_{2.72}$ was 30 $m^2/g$.

20 pts. wt. $Cu_{0.2}WO_{2.72}$ powder thus formed, 75 pts. wt. toluene, and 5 pts. wt. polyacrylate-based dispersant were mixed, and subjected to dispersion processing, to obtain a dispersion solution (solution A) in which the average dispersed particle diameter was 80 nm. 10 pats. wt. solution A thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and an infrared-shielding film was thereby obtained.

A measurement of optical characteristics of the resulting infrared-shielding film revealed that the film had a visible light transmittance of 61%, thus allowing the light in the visible region to be sufficiently transmitted. Also, it was found that the film had a solar radiation transmittance of 45%, and shut about 55% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

However, the aforementioned visible light transmittance and the solar radiation transmittance are changed in accordance with an amount of the infrared-shielding material dispersed per unit area. Therefore, both of the visible light transmittance and the solar radiation transmittance are fluctuated in association with the amount of the infrared-shielding material. Note that a production condition of the infrared-shielding material described in the examples, power characteristics, and an outline of the optical characteristics were described in a list shown in FIG. 5.

The same can be said for the examples as will be shown hereunder.

EXAMPLE 2

Tungsten hexachloride was dissolved in small portions in ethanol to obtain a solution. The solution was dried at 130° C., to obtain the starting material in a powder state. This starting material was heated at 550° C. in a reductive atmosphere (argon/hydrogen=95/5 by volume) for 1 hour, and cooled to room temperature once, then heated for one hour at 800° C. in an argon atmosphere. Powder of $W_{18}O_{49}(WO_{2.72})$ was thus produced.

An X-ray diffraction crystallography performed on the resultant $WO_{2.72}$ revealed the presence of crystalline phase of $W_{18}O_{49}$. The specific surface area of $WO_{2.72}$ was 30 m$^2$/g.

20 pts. wt. $WO_{2.72}$ powder thus formed, 75 pts. wt. toluene, and 5 pts. wt. polyacrylate-based dispersant were mixed, and subjected to dispersion processing, to obtain a dispersion solution (solution B) in which the average dispersed particle diameter was 80 nm. 10 pats. wt. solution B thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50) to deposit a film. The deposited film was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 57%, thus allowing the light in the visible region to be sufficiently transmitted. Further, it was found that the film had a solar radiation transmittance of 42%, and shut about 58% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 3

Tungsten hexachloride and copper dichloride were each weighed so that the molar ratio of W to Cu was 1:0.2.Each compound was dissolved in small portions in ethanol to obtain a mixture solution. The mixture solution was dried at 350° C. in the atmosphere to obtain the starting material in a powder state. This starting material was heated at 980° C. in an argon atmosphere for 15 hours to produce the powder of $Cu_{0.2}WO_{2.72}$. The specific surface area of $Cu_{0.2}WO_{2.72}$ powder was 31 m$^2$/g.

20 pts. wt. $Cu_{0.2}WO_{2.72}$ powder thus obtained, 75 pts. wt. toluene, and 5 pts. wt. polyacrylate-based dispersant were mixed, and subjected to dispersion processing, to obtain a dispersion solution (solution C) in which the average dispersed particle diameter was 80 nm. 10 pats. wt. solution C thus obtained and 100 pts. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film is thus formed. The film thus formed was dried at 60° C. for 30 seconds to evaporate the solvent and was cured by a high-pressure mercury lamp, and an infrared-shielding film was thereby obtained.

The measurement of optical characteristics of the resulting infrared-shielding film revealed that the film had a visible light transmittance of 58%, thus allowing the light in the visible region to be sufficiently transmitted. Further, it was found that the film had a solar radiation transmittance of 43%, and shut about 57% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 4

Tungsten hexachloride and aluminum nitrate were each weighed so that the molar ratio of W to Al was 1:0.1.Each compound was dissolved in small portions in ethanol to obtain a mixture. The mixture was dried at 130° C., to obtain the starting material in a powdery state. This starting material was heated at 550° C. in a reductive atmosphere (argon/hydrogen=95/5 by volume) for 1 hour, then cooled to room temperature, and heated at 800° C. for one hour in an argon atmosphere, thus producing powder of $Al_{0.1}WO_{2.72}$. An X-ray diffraction crystallography performed on the resultant $Al_{0.1}WO_{2.72}$ revealed the presence of crystalline phase of $W_{18}O_{49}$. The specific surface area of $Al_{0.1}WO_{2.72}$ was 28 m$^2$/g.

20 pts. wt. $Al_{0.1}WO_{2.72}$ powder thus formed, 75 pts. wt. toluene, and 5 pts. wt. polyacrylate-based dispersant were mixed, and subjected to dispersion processing, to obtain a dispersion solution (solution D) in which the average dispersed particle diameter was 80 nm. 10 pats. wt. solution D thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 61%, thus allowing the light in the visible region to be sufficiently transmitted. Also, it was found that the film had a solar radiation transmittance of 45%, and shut about 55% of direct incident light of the solar ray, thus exhibiting excellent heat insulating effect. Further, the haze was 0.9%, thereby exhibiting high transparency, and an internal state could be clearly confirmed from an external part. Clear blue is obtained as a transmitting color tone.

EXAMPLE 5

Tungsten hexachloride and manganese nitrate were each weighed so that the molar ratio of W to Mn was 1:0.1. Each compound was dissolved in small portions in ethanol to obtain a mixture solution. The mixture solution was dried at 130° C. to obtain the starting material in a powder state. This material was heated at 550° C. in a reductive atmosphere (argon/hydrogen=95/5 by volume) for 1 hour, and cooled to room temperature once, then heated for one hour at 800° C. in an argon atmosphere. Powder of $Mn_{0.1}WO_{2.72}$ was thus produced. An X-ray diffraction crystallography performed on the resultant $Mn_{0.1}WO_{2.72}$ revealed the presence of crystalline phase of $W_{18}O_{49}$, and the specific surface area of this powder was 30 $m^2/g$.

20 pts. wt. $Mn_{0.1}WO_{2.72}$ powder thus formed, 75 pts. wt. toluene, and 5 pts. wt. polyacrylate-based dispersant were mixed, and subjected to dispersion processing, to obtain a dispersion solution (solution E) in which the average dispersed particle diameter was 80 nm. 10 pats. wt. solution E thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50) to deposit a film. The deposited film was dried at 60° C. for 30 seconds to evaporate the solvent and was cured by a high-pressure mercury lamp, and an infrared-shielding film was thereby obtained.

The measurement of optical characteristics of the resulting infrared-shielding film revealed that the film had a visible light transmittance of 60%, thus allowing the light in the visible region to be sufficiently transmitted. Further, it was found that the film had a solar radiation transmittance of 49%, and shut about 51% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 6

By selecting a tungsten trioxide powder as the starting material, the starting material was heated at 550° C. in a reductive atmosphere (argon/hydrogen=95/5 by volume) for 1 hour, then cooled to room temperature, and heated at 800° C. for one hour in an argon atmosphere, thus producing powder of $WO_{2.72}$. An X-ray diffraction crystallography performed on the resultant $WO_{2.72}$ revealed the presence of crystalline phase of $W_{18}O_{49}$. The specific surface area of this powder was 35 $m^2/g$.

20 pts. wt. $WO_{2.72}$ powder thus formed, 75 pts. wt. toluene, and 5 pts. wt. polyacrylate-based dispersant were mixed, and subjected to dispersion processing, to obtain a dispersion solution (solution F) in which the average dispersed particle diameter was 80 nm. 10 pats. wt. solution F thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50) to deposit a film. The deposited film was dried at 60° C. for 30 seconds to evaporate the solvent and was cured by a high-pressure mercury lamp, and an infrared-shielding film was thereby obtained.

The measurement of optical characteristics of the resulting infrared-shielding film revealed that the film had a visible light transmittance of 65%, thus allowing the light in the visible region to be sufficiently transmitted. Further, it was found that the film had a solar radiation transmittance of 50%, and shut about 50% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 7

Tungsten hexachloride and indium nitrate were each weighed so that the molar ratio of W to In was 1:0.3. Each compound was dissolved in small portions in ethanol to obtain a mixture. The mixture was dried at 130° C. to obtain the starting material in a powder state. This material was heated at 500° C. in a reductive atmosphere (argon/hydrogen=95/5 by volume) for 1 hour, and cooled to room temperature, and heated at 800° C. for one hour in an argon atmosphere, thus producing powder of $In_{0.3}WO_3$. An X-ray diffraction crystallography performed on the resultant $In_{0.3}WO_3$ the presence of a crystal phase of hexagonal tungsten bronze (fine particles of a tungsten oxide composite). The specific surface area of this powder was 30 $m^2/g$.

20 pts. wt. $In_{0.3}WO_3$ powder thus formed, 75 pts. wt. toluene, and 5 pts. wt. polyacrylate-based dispersant were mixed, and subjected to dispersion processing, to obtain a dispersion solution (solution H) in which the average dispersed particle diameter was 80 nm. 10 pats. wt. solution H thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 65%, thus allowing the light in the visible region to be sufficiently transmitted. Also, it was found that the film had a solar radiation transmittance of 44%, and shut about 56% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 8

20 pts. wt. $WO_{2.72}$ powder thus formed, 75 pts. wt. toluene, and 5 pts. wt. polyacrylate-based dispersant were mixed, and subjected to dispersion processing, to obtain a dispersion solution (solution I) having an average dispersed particle diameter of 80 nm. Using a vacuum drier at 50° C., the solvent was removed from the solution I to obtain a powder (powder I). 0.01 kg of the powder I and 8.7 kg of PET resin were dry-blended in a V-blender. The mixture was thoroughly mixed at a temperature near the melting point of the resin in an airtight condition and was melt-extruded into a 50 μm thick infrared-shielding film.

The measurement of optical characteristics of the resulting infrared-shielding film revealed that the film had a visible light transmittance of 58%, thus allowing the light in the visible region to be sufficiently transmitted. Also, it was found that the film had a solar radiation transmittance of 42%, and shut about 58% of direct incident light of the solar ray, thus exhibiting excellent heat insulating effect. Further, the haze was 0.7%, thereby exhibiting high transparency, and an internal state could be clearly confirmed from an external part. Clear blue was obtained as a transmitting color tone.

EXAMPLE 9

Tungsten hexachloride was dissolved in small portions in ethanol to obtain a solution. The solution was dried at 130° C. to obtain the starting material in a powder state. This material was heated at 350° C. in a reductive atmosphere (argon/hydrogen=95/5 by volume) for 1 hour, then cooled to room temperature, and heated at 800° C. for one hour in an argon atmosphere, thus producing a mixed powder of $WO_{2.83}$ and $WO_{2.92}$. An X-ray diffraction crystallography performed on the resultant $WO_{2.83}$ and $WO_{2.92}$ revealed the presence of crystalline phase of $W_{24}O_{68}$ and $W_{25}O_{73}$. The specific surface area of $W_{24}O_{68}$ and $W_{25}O_{73}$ was 30 m$^2$/g.

20 pts. wt. $WO_{2.83}$ and $WO_{2.92}$ mixed powder thus formed, 75 pts. wt. toluene, and 5 pts. wt. polyacrylate-based dispersant were mixed, and subjected to dispersion processing, to obtain a dispersion solution (solution J) in which the average dispersed particle diameter was 80 nm. 10 pats. wt. solution J thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 61%, thus allowing the light in the visible region to be sufficiently transmitted. Also, it was found that the film had a solar radiation transmittance of 42%, and shut about 58% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 10

Tungsten hexachloride was dissolved in small portions in ethanol to obtain a solution. The solution was dried at 130° C. to obtain the starting material in a powder state. This material was heated at 800° C. in an argon atmosphere for 1 hour to produce a powder mixture of $WO_{2.83}$ and $WO_{2.92}$. An X-ray diffraction crystallography performed on the resultant mixture of $WO_{2.83}$ and $WO_{2.92}$ revealed the presence of crystalline phase of $W_{24}O_{68}$ and $W_{25}O_{73}$. The specific surface area of the mixture of $WO_{2.83}$ and $WO_{2.92}$ was 30 m$^2$/g.

20 pts. wt. $WO_{2.83}$ and $WO_{2.92}$ mixed powder thus formed, 75 pts. wt. toluene, and 5 pts. wt. polyacrylate-based dispersant were mixed, and subjected to dispersion processing, to obtain a dispersion solution (solution K) in which the average dispersed particle diameter was 80 nm. 10 pats. wt. solution K thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 67%, thus allowing the light in the visible region to be sufficiently transmitted. Also, it was found that the film had a solar radiation transmittance of 49%, and shut about 51% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 11

Tungsten hexachloride and barium perchlorate trihydrate were each weighed so that the molar ratio of W to Ba was 1:0.21. Each compound was individually dissolved in small portions in ethanol and the two solutions were mixed with each other to obtain a mixture. The mixture was dried at 130° C. to obtain the starting material in a powder state. This material was heated at 550° C. in a reductive atmosphere (argon/hydrogen=95/5 by volume) for 1 hour, cooled to room temperature, and heated at 800° C. for one hour in an argon atmosphere, thus producing powder of $Ba_{0.21}WO_3$. The specific surface area of the $Ba_{0.21}WO_3$ was 30 m$^2$/g.

20 pts. wt. $Ba_{0.21}WO_3$ powder thus formed, 75 pts. wt. toluene, and 5 pts. wt. polyacrylate-based dispersant were mixed, and subjected to dispersion processing, to obtain a dispersion solution (solution L) in which the average dispersed particle diameter was 80 nm. 10 pats. wt. solution L thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 59%, thus allowing the light in the visible region to be sufficiently transmitted. Also, it was found that the film had a solar radiation transmittance of 35%, and shut about 65% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 12

An aqueous solution of ammonium meta tungstate (50 wt % in terms of $WO_3$) and an aqueous solution of cesium chloride were each weighed so that the molar ratio of W to Cs was 1:0.33. The two solutions were mixed with each other to obtain a mixture solution. The mixture solution was dried at 130° C. to obtain the starting material in a powder state. This material was heated at 550° C. in a reductive atmosphere (argon/hydrogen=95/5 by volume) for 1 hour, then cooled to room temperature, and heated at 800° C. for one hour in an argon atmosphere, thus producing powder of $Cs_{0.33}WO_3$. The specific surface area of this powder was 20 m$^2$/g. An X-ray diffraction crystallography revealed the presence of a crystal phase of hexagonal tungsten bronze (fine particles of a tungsten oxide composite).

20 pts. wt. $Cs_{0.33}WO_3$ powder thus formed, 75 pts. wt. toluene, and 5 pts. wt. polyacrylate-based dispersant were mixed, and subjected to dispersion processing, to obtain a dispersion solution (solution M) in which the average dispersed particle diameter was 80 nm. 10 pats. wt. solution M thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 72%, thus allowing the light in the visible region to be sufficiently transmitted. Also, it was found that the film had a solar radiation transmittance of 39%, and shut about 61% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 13

An aqueous solution of ammonium meta tungstate (50 wt % in terms of $WO_3$) and an aqueous solution of thalium formate were each weighed so that the molar ratio of W to Tl was 1:0.33. The two solutions were mixed with each other to obtain a mixture solution. The mixture solution was dried at 130° C. to obtain the starting material in a powder state. This material was heated at 550° C. in a reductive atmosphere (argon/hydrogen=95/5 by volume) for 1 hour, then cooled to room temperature, and heated at 800° C. for one hour in an argon atmosphere, thus producing powder of $Tl_{0.33}WO_3$. The specific surface area of this powder was 20 $m^2/g$. An X-ray diffraction crystallography revealed the presence of a crystal phase of hexagonal tungsten bronze (fine particles of a tungsten oxide composite).

20 pts. wt. $Tl_{0.33}WO_3$ powder thus formed, 75 pts. wt. toluene, and 5 pts. wt. polyacrylate-based dispersant were mixed, and subjected to dispersion processing, to obtain a dispersion solution (solution N) in which the average dispersed particle diameter was 80 nm. 10 pats. wt. solution N thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 71%, thus allowing the light in the visible region to be sufficiently transmitted. Also, it was found that the film had a solar radiation transmittance of 42%, and shut about 58% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 14

An aqueous solution of ammonium meta tungstate (50 wt % in terms of $WO_3$) and an aqueous solution of rubidium chloride were each weighed so that the molar ratio of W to Rb was 1:0.33. The two solutions were mixed with each other to obtain a mixture solution. The mixture solution was dried at 130° C. to obtain the starting material in a powder state. This material was heated at 550° C. in a reductive atmosphere (argon/hydrogen=95/5 by volume) for 1 hour, then cooled to room temperature, and heated at 800° C. for one hour in an argon atmosphere, thus producing powder of $Rb_{0.33}WO_3$. The specific surface area of this powder was 20 $m^2/g$. An X-ray diffraction crystallography revealed the presence of a crystal phase of hexagonal tungsten bronze (fine particles of a tungsten oxide composite).

20 pts. wt. $Rb_{0.33}WO_3$ powder thus formed, 75 pts. wt. toluene, and 5 pts. wt. polyacrylate-based dispersant were mixed, and subjected to dispersion processing, to obtain a dispersion solution (solution O) in which the average dispersed particle diameter was 80 nm. 10 pats. wt. solution O thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 76%, thus allowing the light in the visible region to be sufficiently transmitted. Also, it was found that the film had a solar radiation transmittance of 47%, and shut about 53% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 15

An aqueous solution of ammonium meta tungstate (50 wt % in terms of $WO_3$) and an aqueous solution of potassium chloride were each weighed so that the molar ratio of W to K was 1:0.33. The two solutions were mixed with each other to obtain a mixture solution. The mixture solution was dried at 130° C. to obtain the starting material in a powder state. This material was heated at 550° C. in a reductive atmosphere (argon/hydrogen=95/5 by volume) for 1 hour, then cooled to room temperature, and heated at 800° C. for one hour in an argon atmosphere, thus producing powder of $K_{0.33}WO_3$. The specific surface area of this powder was 20 $m^2/g$. An X-ray diffraction crystallography revealed the presence of a crystal phase of hexagonal tungsten bronze (fine particles of a tungsten oxide composite).

20 pts. wt. $K_{0.33}WO_3$ powder thus formed, 75 pts. wt. toluene, and 5 pts. wt. polyacrylate-based dispersant were mixed, and subjected to dispersion-processing, to obtain a dispersion solution (solution P) in which the average dispersed particle diameter was 80 nm. 10 pats. wt. solution P thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 68%, thus allowing the light in the visible region to be sufficiently transmitted. Also, it was found that the film had a solar radiation transmittance of 43%, and shut about 57% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 16

An aqueous solution of ammonium meta tungstate (50 wt % in terms of $WO_3$) and an aqueous solution of barium hydroxide octahydrate were each weighed so that the molar ratio of W to Ba was 1:0.33. The two solutions were mixed with each other to obtain a mixture solution. The mixture solution was dried at 130° C. to obtain the starting material in a powder state. This material was heated at 450° C. in a reductive atmosphere (argon/hydrogen=95/5 by volume) for 1 hour, then cooled to room temperature, and heated at 800° C. for one hour in an argon atmosphere, thus producing powder of $Ba_{0.33}WO_3$. The specific surface area of this powder was 20 $m^2/g$. An X-ray diffraction crystallography revealed the presence of a crystal phase of hexagonal tungsten bronze (fine particles of a tungsten oxide composite).

20 pts. wt. $Ba_{0.33}WO_3$ powder thus formed, 75 pts. wt. toluene, and 5 pts. wt. polyacrylate-based dispersant were mixed, and subjected to dispersion processing, to obtain a dispersion solution (solution Q) in which the average dispersed particle diameter was 80 nm. 10 pats. wt. solution Q thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 75%, thus allowing the light in the visible region to be sufficiently transmitted. Also, it was found that the film had a solar radiation transmittance of 54%, and shut about 46% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 17

A powder of a tungsten oxide hydrate represented by $WO_3.H_2O$ and a powder of cesium carbonate were each weighed so that the molar ratio of W to Cs is 1:0.33. The two powders were mixed together to obtain a powder mixture to obtain the starting material in a powder state. This material was heated at 600° C. in a reductive atmosphere (argon/hydrogen=97/3 by volume) for 1 hour, then cooled to room temperature, and heated at 800° C. for one hour in an argon atmosphere, thus producing powder of $Cs_{0.33}WO_3$. The specific surface area of this powder was 20 $m^2/g$. An X-ray diffraction crystallography revealed the presence of a crystal phase of hexagonal tungsten bronze (fine particles of a tungsten oxide composite).

20 pts. wt. $Cs_{0.33}WO_3$ powder thus formed, 75 pts. wt. toluene, and 5 pts. wt. polyacrylate-based dispersant were mixed, and subjected to dispersion processing, to obtain a dispersion solution (solution R) in which the average dispersed particle diameter was 80 nm. 10 pats. wt. solution R thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 70%, thus allowing the light in the visible region to be sufficiently transmitted. Also, it was found that the film had a solar radiation transmittance of 36%, and shut about 64% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 18

A powder of a tungsten oxide hydrate represented by $WO_3.H_2O$ and a powder of potassium carbonate were each weighed so that the molar ratio of W to K is 1:0.55. The two powders were mixed together to obtain a powder mixture to obtain the starting material in a powder state. This material was heated at 600° C. in a reductive atmosphere (argon/hydrogen=97/3 by volume) for 1 hour, then cooled to room temperature, and heated at 800° C. for one hour in an argon atmosphere, thus producing powder of $K_{0.55}WO_3$. The specific surface area of this powder was 30 $m^2/g$. An X-ray diffraction crystallography revealed a crystal phase of tetragonal tungsten bronze (fine particles of a tungsten oxide composite).

20 pts. wt. $K_{0.55}WO_3$ powder thus formed, 75 pts. wt. toluene, and 5 pts. wt. polyacrylate-based dispersant were mixed, and subjected to dispersion processing, to obtain a dispersion solution (solution S) in which the average dispersed particle diameter was 80 nm. 10 pats. wt. solution S thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 69%, thus allowing the light in the visible region to be sufficiently transmitted. Also, it was found that the film had a solar radiation transmittance of 40%, and shut about 60% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

EXAMPLE 19

A powder of a tungsten oxide hydrate represented by $WO_3 \cdot H_2O$ and a powder of sodium carbonate were each weighed so that the molar ratio of W to Na was 1:0.50. The two powders were mixed together to obtain a powder mixture solution to serve as the starting material. This material was heated at 600° C. in a reductive atmosphere (argon/hydrogen=97/3 by volume) for 1 hour, then cooled to room temperature, and heated at 800° C. for one hour in an argon atmosphere, thus producing powder of $Na_{0.5}WO_3$. The specific surface area of this powder was 20 $m^2/g$. An X-ray diffraction crystallography revealed a crystal phase of cubic tungsten bronze (fine particles of a tungsten oxide composite).

20 pts. wt. $Na_{0.5}WO_3$ powder thus formed, 75 pts. wt. toluene, and 5 pts. wt. polyacrylate-based dispersant were mixed, and subjected to dispersion processing, to obtain a dispersion solution (solution T) in which the average dispersed particle diameter was 80 nm. 10 pats. wt. solution T thus formed and 100 pats. wt. UV-curable hardcoat resin (solid component=100%) were mixed to obtain the fine particle dispersion solution of the infrared-shielding material. Using a bar coater, this infrared-shielding dispersion solution was applied to a PET resin film (HPE-50), and a film was thereby formed. The film thus formed was dried at 60° C. for 30 seconds to evaporate the solvent and was cured by a high-pressure mercury lamp, and the infrared-shielding film was thereby obtained.

The measurement of optical characteristics of the resulting infrared-shielding film revealed that the film had a visible light transmittance of 75%, thus allowing the light in the visible region to be sufficiently transmitted. Also, it was found that the film had a solar radiation transmittance of 53%, and shut about 47% of direct incident light of the solar ray, thus exhibiting excellent heat insulating effect. Further, the haze was 0.9%, thereby exhibiting high transparency, and an internal state could be clearly confirmed from an external part. Clear blue was obtained as a transmitting color tone.

COMPARATIVE EXAMPLE 1

The optical characteristic of the PET resin film (HPE-50) itself, which was used as a substrate in the example 1 to 10, was measured. It was found that the film had a visible light transmittance of 88%, thus allowing the light in the visible region to be sufficiently transmitted, however the film had a solar radiation transmittance of 88%, and shut only about 12% of direct incident light of the solar ray, thus exhibiting low insulating effect.

REFERENCE EXAMPLE 1

A dispersion film was fabricated in the same manner as in Example 2, except that a powder of $WO_3$ (tungsten trioxide) was used in place of the $W_{18}O_{49}$ powder. The measurement of optical characteristics of the dispersion film revealed that the film had a visible light transmittance of 83.44%, a solar radiation transmittance of 81.76%, and shut approximately 17.24% of the incident sunlight.

INDUSTRIAL APPLICABILITY

The present invention is suitably used for giving infrared-shielding effects to a window material and electronic equipment used in the fields of construction and transportation equipment, and so forth.

Brief Description of the Drawings

FIG. 1 shows an example of a measurement result of a transmission profile of a fine particle dispersion film of $W_{18}O_{49}$ according to the present invention.

FIG. 2 shows an example of a measurement result of a transmission profile of a dispersion film of tungsten oxide composite of the present invention, comprising fine particles of $Cs_{0.33}WO_3$ with a hexagonal crystal structure.

FIG. 3 shows an example of a measurement result of a transmission profile of a dispersion film of tungsten oxide composite of the present invention, comprising fine particles of $Rb_{0.33}WO_3$ with a hexagonal crystal structure.

FIG. 4 is a schematic diagram of a crystal structure of tungsten oxide composite with a hexagonal crystal system.

FIG. 5 is a list of production conditions, powder characteristics, and optical characteristics of an infrared-shielding material according to examples of the present invention.

DESCRIPTION OF SIGNS AND NUMERALS

1 $WO_6$ UNIT
2 ELEMENT M
3 HEXAGONAL CRYSTAL STRUCTURE

The invention claimed is:

1. A fine particle dispersion of infrared-shielding material, the fine particle dispersion having visible light transparency, and is formed by dispersing fine particles of an infrared-shielding material in a medium, wherein the fine particles of the infrared-shielding material are
   tungsten oxide composite fine particles expressed by a general formula $M_xW_yO_z$, where M is at least one element selected from the group consisting of H, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I and a mixture thereof;
   W is tungsten;
   O is oxygen; and
   the general formula $M_xW_yO_z$ satisfies $0.001 \leq x/y \leq 1$ and $2.2 \leq z/y \leq 3.0$;
   a particle diameter of the infrared-shielding material is not less than 1 nm and not more than 800 nm; and
   the medium is resin or glass.

2. The fine particle dispersion of infrared-shielding material according to claim 1, wherein the fine particles of the tungsten oxide composite expressed by the general formula $M_xW_yO_z$ comprise at least one kind of fine particles of hexagonal, tetragonal, or cubic crystal structure.

3. The fine particle dispersion of infrared-shielding material according to claim 1, wherein all or less than all of the fine particles of tungsten oxide composite expressed by the general formula $M_xW_yO_z$ are of hexagonal crystal structure.

4. The fine particle dispersion of infrared-shielding material according to claim 2, wherein the element M is at least one kind of element selected from the group consisting of Cs, Rb, K, Tl, In, Ba, Li, Ca, Sr, Fe and Sn.

5. The fine particle dispersion of infrared-shielding material according to claim 1, wherein the fine particles of infrared-shielding material are coated with oxide containing at least one kind of element selected from the group consisting of Si, Ti, Zr and Al.

6. The fine particle dispersion of infrared-shielding material according to claim 1, wherein the medium is a resin comprising at least one kind of element selected from the group consisting of polyethylene resin, polyvinyl chloride resin, polyvinylidene chloride resin, polyvinyl alcohol resin, polystyrene resin, polypropylene resin, ethylene-vinyl acetate copolymer, polyester resin, polyethylene terephthalate resin, fluorine resin, polycarbonate resin, acrylic resin and polyvinyl butyral resin.

7. An infrared-shielding body, wherein the fine particle dispersion of infrared-shielding material according to claim 1 is formed in a plate shape, in a film shape, or in a thin film shape.

8. A production method of fine particles of infrared-shielding material, the fine particles having visible light transparency, and is formed by dispersing fine particles of an infrared-shielding material in a medium, wherein the fine particles of the infrared-shielding material are tungsten oxide composite fine particles expressed by the general formula: $M_xW_yO_z$ where M is at least one kind of element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I and a mixture thereof;

W is tungsten;

O is oxygen; and the general formula $M_xW_yO_z$ satisfies $0.001 \leq x/y \leq 1$ and $2.2 \leq z/y \leq 3.0$; and a particle diameter of the infrared-shielding material is not less than 1 nm and not more than 800 nm; and the medium is resin or glass;

the method comprising the step of:

heating a starting material of the fine particles of the infrared-shielding material in a reductive gas and/or inert gas atmosphere.

9. The production method of the fine particles of infrared-shielding material according to claim 8, wherein the starting material of the fine particles of infrared-shielding material is heated at 100° C. to 850° C. in a reductive gas atmosphere and subsequently heated at 650° C. to 1200° C. in an inert gas atmosphere.

10. The production method of the fine particles of infrared-shielding material according to claim 8, wherein the starting material of the fine particles of the tungsten oxide composite expressed by the general formula, $M_xW_yO_z$, is a powder obtained by mixing a powder of the element M or a compound containing the element M with more than one kind of powder selected from the group consisting of:

a tungsten trioxide powder;

a tungsten dioxide powder;

a powder of tungsten oxide hydrate;

a tungsten hexachloride powder;

an ammonium tungstate powder;

a powder of tungsten oxide hydrate obtained by dissolving tungsten hexachloride in an alcohol and then drying the solution;

a powder of tungsten oxide hydrate obtained by dissolving tungsten hexachloride in an alcohol, adding water to the solution to form a precipitate, and drying the precipitate;

a powder of tungsten compound obtained by drying an aqueous solution of ammonium tungstate; and a metal tungsten powder.

11. The production method of the fine particles of infrared-shielding material according to claim 8, wherein the starting material of the fine particles of the tungsten oxide composite expressed by the general formula $M_xW_yO_z$ is a powder obtained by mixing an alcohol solution of tungsten hexachloride or an aqueous solution of ammonium tungstate with a solution of a compound containing the element M, and drying the mixture.

12. The production method of the fine particles of infrared-shielding material according to claim 8, wherein the starting material of the fine particles of tungsten oxide composite expressed by the general formula $M_xW_yO_z$ is a powder obtained by:

mixing a powder of either the element M or a compound containing the element M, or a solution of a compound containing the element M, with a dispersion solution, the dispersion solution obtained by dissolving tungsten hexachloride in an alcohol and adding water to the solution to form a precipitate; and drying the mixture.

* * * * *